US011415664B2

(12) United States Patent
Hammes et al.

(10) Patent No.: US 11,415,664 B2
(45) Date of Patent: Aug. 16, 2022

(54) METHOD AND SYSTEM FOR OBTAINING AN ADAPTIVE ANGLE-DOPPLER AMBIGUITY FUNCTION IN MIMO RADARS

(71) Applicants: IEE INTERNATIONAL ELECTRONICS & ENGINEERING S.A., Echternach (LU); UNIVERSITE DU LUXEMBOURG, Esch-sur-Alzette (LU)

(72) Inventors: Christian Hammes, Trier (DE); Yogesh Nijsure, Ottawa (CA); Bjorn Ottersten, Luxembourg (LU); Thiemo Spielmann, Luxembourg (LU); Bhavani Shankar Mysore Rama Rao, Luxembourg (LU); Udo Schroder, Fohren (DE)

(73) Assignees: IEE INTERNATIONAL ELECTRONICS & ENGINEERING S.A., Echternach (LU); UNIVERSITE DU LUXEMBOURG, Luxembourg (LU)

( * ) Notice: Subject to any disclaimer, the term of this patent is extended or adjusted under 35 U.S.C. 154(b) by 360 days.

(21) Appl. No.: 16/490,824

(22) PCT Filed: Mar. 1, 2018

(86) PCT No.: PCT/EP2018/054995
§ 371 (c)(1),
(2) Date: Sep. 3, 2019

(87) PCT Pub. No.: WO2018/158353
PCT Pub. Date: Sep. 7, 2018

(65) Prior Publication Data
US 2020/0011968 A1 Jan. 9, 2020

(30) Foreign Application Priority Data
Mar. 3, 2017 (LU) .................................. LU 100 128
Oct. 11, 2017 (LU) .................................. LU 100 480

(51) Int. Cl.
*G01S 13/58* (2006.01)
*G01S 7/35* (2006.01)
(Continued)

(52) U.S. Cl.
CPC ............. *G01S 7/354* (2013.01); *G01S 13/003* (2013.01); *G01S 13/42* (2013.01); *G01S 13/52* (2013.01);
(Continued)

(58) Field of Classification Search
CPC ...... G01S 17/354; G01S 13/003; G01S 13/42; G01S 13/931; G01S 13/536; G01S 13/52; G01S 7/354; H01Q 21/293
(Continued)

(56) References Cited

U.S. PATENT DOCUMENTS

2009/0027257 A1* 1/2009 Arikan et al. ........ G01S 13/325
342/159
2010/0328157 A1* 12/2010 Culkin ................. H01Q 21/061
342/73
(Continued)

FOREIGN PATENT DOCUMENTS

DE 3501952 C1 3/1991

OTHER PUBLICATIONS

Devara Mounika, Target Detection Using Cross Ambiguity Function, Sep. 2015, International Research Journal of Engineering and Technology, vol. 02 Issue: 06, pp. 1335-1338.*
(Continued)

*Primary Examiner* — Thomas M Hammond, III
(74) *Attorney, Agent, or Firm* — Reising Ethington P.C.

(57) ABSTRACT

A method for obtaining an adaptive angle-Doppler ambiguity function (AF) for a target using multiple-input-multiple-output (MIMO) radar that includes a transmit antenna array having a plurality of antenna elements. The method includes
(Continued)

generating transmit signals for transmission by the transmit antenna array, the transmit signals defining at least a first transmit trajectory of a phase center within the transmit antenna array; transmitting the transmit signals using the transmit antenna array and receiving receive signals from the target, the receive signals resulting from the incidence of the transmit signals upon the target; and obtaining at least an angle-Doppler ambiguity function (AF) from the receive signals. The first transmit trajectory is such that, in operation, the phase center undergoes random phase center motion (PCM), such that a phase center position within the transmit antenna array varies randomly with time. A system for obtaining an AF is also disclosed.

20 Claims, 6 Drawing Sheets

(51) Int. Cl.
| | | |
|---|---|---|
| | G01S 13/00 | (2006.01) |
| | G01S 13/42 | (2006.01) |
| | G01S 13/536 | (2006.01) |
| | G01S 13/931 | (2020.01) |
| | H01Q 21/29 | (2006.01) |
| | G01S 13/52 | (2006.01) |

(52) U.S. Cl.
CPC .......... *G01S 13/536* (2013.01); *G01S 13/931* (2013.01); *H01Q 21/293* (2013.01)

(58) Field of Classification Search
USPC ........................................................ 342/107
See application file for complete search history.

(56) References Cited

U.S. PATENT DOCUMENTS

| | | | |
|---|---|---|---|
| 2014/0266868 A1* | 9/2014 | Schuman | G01S 13/9029 342/25 R |
| 2016/0131742 A1* | 5/2016 | Schoor | G01S 13/931 342/128 |
| 2016/0282450 A1* | 9/2016 | Kishigami | G01S 7/285 342/147 |
| 2017/0102458 A1* | 4/2017 | Schuman | G01S 7/414 |
| 2019/0346544 A1* | 4/2019 | Hammes | G01S 13/343 342/128 |

OTHER PUBLICATIONS

Christian Hammes, Random Phase Center Motion Technique for Enhanced Angle-Doppler Discrimination Using MIMO Radars, 2017, ISBN 978-0-9928626-7-1 © EURASIP 2017, 2017 25th European Signal Processing Conference (EUSIPCO).*

International Search Report corresponding to International application No. PCT/EP2018/054995, dated May 23, 2018, 5 pages.

Written Opinion corresponding to International application No. PCT/EP2018/054995, dated May 23, 2018, 7 pages.

D. Zoeke et al., "Phase Migration Effects in Moving Target Localization Using Switched MIMO Arrays", Proceedings of the 12th European Radar Conference, pp. 85-88, dated Sep. 9, 2015.

L. Yongzhe et al., "Ambiguity Function of the Transmit Beamspace-Based MIMO Radar", IEEE Transactions on Signal Processing, vol. 63, No. 17, pp. 4445-4457, dated Sep. 1, 2015.

Y.B. Gan et al., "Linear Antenna Arrays With Bidirectional Phase Center Motion", IEEE Transactions on Antennas and Propagation, vol. 53, No. 5, dated May 1, 2005, pp. 1829-1835.

B.T. Perry et al., "Low Cost Phased Array Radar for Applications in Engineering Education", IEEE International Symposium on Phased Array Systems and Technology, dated Oct. 15, 2013, pp. 416-420.

F.C. Robey et al., "MIMO Radar Theory and Experimental Results", Signals, Systems and Computers, dated Nov. 7, 2004, pp. 300-304.

* cited by examiner

METHOD AND SYSTEM FOR OBTAINING AN ADAPTIVE ANGLE-DOPPLER AMBIGUITY FUNCTION IN MIMO RADARS

TECHNICAL FIELD

The present invention generally relates to a wireless detection of objects using MIMO radar, e.g. for use in an automotive vehicle, and more particularly to a method and system for obtaining an angle-Doppler ambiguity function (AF) using random phase center motion (PCM); the invention also provides for a AF that can be made adaptive.

BACKGROUND OF THE INVENTION

In modern vehicles, radar systems are increasingly used, i.e. for sensing neighboring objects/targets (including other vehicles), for lane changing, collision avoidance and other driver assist functions.

Unambiguous discrimination in radar systems with respect to angle, Doppler and range remains an area of investigation. Angular resolution is physically limited by the total antenna array size.

Known techniques can be divided into three different topics which are all involving a kind of phase center motion but with different terminology.

Synthetic aperture radar (SAR) utilize Displaced Phase Center Antenna (DPCA) technique, in order to improve the performance of Moving-Target-Indicator (MTI) radars mounted on moving platforms. By shifting the phase center of the antenna backward, the DPCA technique compensates for the forward motion of the moving platform so that, over a few pulse repetition intervals, the antenna is effectively stationary in space.

Literature relating to antennas and propagation are mainly dealing with antenna beam pattern shaping and side lobe suppression. The background of those is lying more on antennas and their radiation characteristic and less in designing signal for coding. Nevertheless, the keywords phase center motion and 4 dimensional array (3 space dimension plus time) are introduced.

Time Division Multiplexed (TDM) MIMO was introduced, where only one transmitter is active at a time in order to achieve orthogonal signals with respect to the angle of arrival. The TDM switching scheme itself can be interpreted as a kind of phase center motion for a single trajectory. Therefore, the relevant literature discloses the use of just a single trajectory and the presented trajectories are all suffering from target Doppler shifts and therefore not orthogonal in angle and Doppler simultaneously.

More particularly, the known virtual Multiple-Input-Multiple-Output (MIMO) concept provides better angular resolution with the same number of antenna elements with respect to their phased array counterpart. The utilization of sparse arrays and orthogonal signals leads to a virtually filled array in the processing unit. Achieving orthogonality with respect to the transmit signals has been extensively discussed in the prior art.

B. T. Perry, T. Levy, P. Bell, S. Davis, K. Kolodziej, N. O'Donoughue, J. S. Herd, "Low Cost Phased Array Radar for Applications in Engineering Education," in IEEE International Symposium on Phased Array Systems and Technology, 2013, discloses low cost Frequency Modulated Continuous Wave (FMCW) radar by switching the transmitters and receivers across FMCW chirps in a linear fashion. The consecutive switching scheme of transmit-receive-pairs yields a simple Discrete Fourier Transform (DFT) based received processing for resolving different angle of arrivals. The side-lobe suppression of the backscatter is addressed by virtual antenna overlapping; this decreases the virtual array aperture and therefore the angular resolution. However, linear switching of antenna elements across pulses results in angle-Doppler coupling.

K. Rambach and B. Yang "Colocated MIMO Radar: Cramer-Rao Bound and Optimal Time Division Multiplexing for DOA Estimation of Moving Targets," in IEEE International Conference on Acoustics, Speech and Signal Processing (ICASSP), 2013, have investigated a time division multiplex (TDM) MIMO radar and analyzed the Direction of Arrival (DoA) estimation of a moving target. Using this Cramer-Rao bound (CRB), they deduced optimal TDM schemes such that the CRB is as small as for a stationary target. Simulations confirmed the theoretical results and showed that the Root mean square error (RMSE) of the maximum likelihood estimator is indeed as small as for a stationary target, if an optimal TDM scheme is used.

C. Hammes, Y. Nij sure, B. Shankar, U. Schroeder, B. Ottersten, "Discrimination of Angle-Doppler Signatures using Arbitrary Phase Center Motion for MIMO Radars," in IEEE Radar Conference, 2017. (available online: http://wwwen.unilu/snt/people/christian_hammes), discloses techniques addressing the aforementioned coupling problem, in which a nonlinear approach is used. That is, a TDM technique is utilized as a virtual motion of the transmit phase center, called Phase Center Motion (PCM). The PCM technique has been introduced as a joint transmit-receive-time modulated array approach, where the PCM is independent of the target motion and, therefore, enables unambiguous multiple target discrimination by using inter-chirp modulation. While time modulated or four dimensional arrays are exploiting apparent antenna motion in an attempt to optimize the radiation pattern sidelobes, the PCM approach in Hammes et al (2017) exploits the time modulation such that a sparse array structure provides thumbtack response within the angle-Doppler domain, called angle-Doppler Ambiguity Function (AF).

SUMMARY

An object of the invention is to address the problem that known techniques do not exploit the space time coding of phase center motion in every sense. In MIMO signal design they do not use phase center motion as a design parameter at all. Therefore, all the signal design algorithms do not consider a complete new degree of freedom. In state of the art MIMO transmit signal design, they are considering time and space separately and not as a joint design parameter, which opens new avenues to signal design.

In TDM MIMO the space time coding is used, but still only on trajectory on a one-dimensional array. The orthogonality in trajectory is not considered and investigated. Furthermore, strong angle Doppler coupling is a big drawback of this approach.

In addition, techniques known from antenna and propagation literature neglect the capability of space time coding with regard to achieving orthogonality at all. To the contrary, they consider it as undesired because the splitting into orthogonal sequences yields a certain energy distribution.

Another object of the present invention is to provide waveforms that can be used to enhance resolution of targets in the angular domain (azimuth and elevation) and Doppler domain as well as interference mitigation in co-existence scenarios.

In order to overcome the abovementioned problems, there is provided a method for obtaining an angle-Doppler ambiguity function (AF) for a target using multiple-input-multiple-output (MIMO) radar, the MIMO radar including a transmit antenna array, the transmit antenna array being at least one-dimensional and having a plurality of antenna elements, the method comprising: generating transmit signals for transmission by the transmit antenna array, the transmit signals defining at least a first transmit trajectory of a phase center within the transmit antenna array; transmitting the transmit signals using the transmit antenna array; receiving receive signals from the target, the receive signals resulting from the incidence of the transmit signals upon the target; and obtaining at least an angle-Doppler ambiguity function (AF) from the receive signals; characterized in that the first transmit trajectory is such that, in operation, the phase center undergoes random phase center motion (PCM) such that a phase center position within the transmit antenna array varies randomly with time.

The phase center position can be varied at any rate. In one embodiment, it is varied on a chirp-by-chirp basis (inter-chip PCM) and denoted by $\chi(i_c)$. The PCM $\chi(i_c)$ represents the position of the phase center in the transmit antenna array at the $i_c$'s chirp. In other embodiment, the phase center can be changed within a chirp (intra-chirp PCM) at a pre-determined rate $1/T_s$ where $T_s$ is the sampling rate; in such cases, the PCM $\chi(i_s)$ represents the position of the phase center in the transmit antenna array at the $i_s$'th sample.

Preferably, the PCM $\chi(i_c)$ includes both correlated and uncorrelated transitions between positions within the transmit antenna array.

Preferably, the first transmit trajectory corresponds to an amplitude modulation (AM) of the transmit signals so as to define a virtual array. Preferably, the phase center can assume any real position within the virtual array. The circumstance that one antenna element is active at the time enables orthogonality in time and therefore the virtual array can be constructed. This orthogonality is achieved both for correlated and uncorrelated transitions of the PCM. The problem which is addressed is of angle-Doppler coupling and the masking of weak reflections from the certain targets, e.g., children by strong reflections from other target e.g., truck.

Preferably, the PCM $\chi(i_c)$ is described by a corresponding probability density function PDF $\rho_{\chi(i_c)}$ and its temporal characteristic determining the nature of PCM transitions with regards to time—correlated or uncorrelated—this is referred to as the spectral property. Preferably, the transmit signals are such that a radiation characteristic $\Gamma(k'_{\phi_k})$ for the time modulated transmit antenna, that is a function of the PCM $\chi(i_c)$ and of the PDF $\rho_{\chi(i_c)}$ is defined, such that $$\Gamma(k'_{\phi_k}) = \int_{-\infty}^{\infty} \rho_\chi(i_{c1}) e^{-jk'_{\phi_k} \chi(i_{c1})} d\chi(i_{c1})$$

where $\chi(i_c)$ denotes the phase center position at the transmit array and the switching across chirps is denoted by the chirp index $i_c$.j is the complex number. The expression for $\Gamma(k'_{\phi_k})$ denotes the Fourier transform of the PDF and can be seen as the spatial spectrum.

Further, the correlation function for PCM induced phase vector $$e^{-jk'_{\phi_k}(q)\chi(i_{c1})},$$

defined as $$r_\chi(\tau) = E\left[e^{-jk'_{\phi_k} \chi(i_{c1})} e^{+jk'_{\phi_k} \chi(i_{c2})}\right]$$

where $E[\bullet]$ denotes the statistical average. When the PCM transitions are uncorrelated, then $$r_\chi(\tau)=\delta(\tau)+(1-\delta(\tau))|\Gamma(k'_{\phi_k})|^2, \tau=i_{c1}-i_{c2}$$

When the PCM transitions are correlated, $r_\chi(\tau)$ is determined by $\rho_{\chi(i_{c1}),\chi(i_{c1}-\tau)}$ the joint PDF of $\chi(i_{c1})$ and $\chi(i_{c2})$ and takes the form $$r_\chi(\tau) = \int_{-\infty}^{\infty} \rho_{\chi(i_{c1}),\chi(i_{c1}-\tau)} e^{-jk'_{\phi_k}[\chi(i_{c1})-\chi(i_{c1}-\tau)]} d\chi(i_{c1}) d\chi(i_{c2})$$

Preferably, the MIMO radar includes a receive antenna array, the receive antenna array being at least one-dimensional and having a plurality of antenna elements, wherein:
receiving the receive signals from the object comprises receiving the receive signals using the receive antenna array; and
the receive signals define at least a first receive trajectory of a phase center within the receive antenna array. Preferably, the first transmit trajectory and the first receive trajectory correspond or are identical.

Preferably, obtaining at least an angle-Doppler ambiguity function (AF) from the receive signals comprises down-converting and digitizing the receive signals to obtain digitized receive signals written in matrix notation $Y \in \mathbb{C}^{I_c \times M}$ and given by $$[Y]_{i_c,m}(i_s) = \sum_{k=1}^{K} c_k e^{jk'_\phi d_R m} e^{jk'_\phi \chi(i_c)} e^{j(\omega_{D_k}(i_c T_c + i_s T_s) + \omega_{B_k} i_s T_s)}$$

Particularly, the received samples, $[Y]_{i_c,m}(i_s)$, at instance $i_s$ for the $i_c$ chirp at the antenna m, containing a superposition of signals reflected from different targets and includes the angle ($k_\phi$), Doppler ($\omega_{D_k}$) and range ($\omega_{B_k}$) information are ordered in a three dimensional datacube. Using suitable designs of PCM helps mitigating the coupling of the angle and Doppler ($k_\phi$, $\omega_{D_k}$). The traditional linear PCM strategies obtained from TDM MIMO cannot mitigate this coupling; in fact, they suffer due to the same. The random PCM provides a means to exploit virtual arrays without the coupling problem.

Preferably, obtaining at least an angle-Doppler ambiguity function (AF) from the receive signals further comprises rearranging the digitized receive signals in a data-cube, where a first dimension contains the intra-chirp samples, a second dimension denotes the inter-chirp samples and a third dimension refers to the data from each receive antenna element.

Preferably, obtaining at least an angle-Doppler ambiguity function (AF) from the receive signals further comprises using a trajectory matched filter bank to extract Doppler and angular information from the receive signals. Preferably, a matched filter is applied to each dimension in order to compress the continuous wave such that the range, angle and Doppler information can be extracted.

Preferably, obtaining at least an angle-Doppler ambiguity function (AF) from the receive signals further comprises squaring the output $[Y]_{i_c,m}(i_s)$ of the matched filter(s) to obtained a squared filter output $[\tilde{Y}]_{p,q}(l)$ for the p-th Doppler bin, q-th angular bin and l-th range bin, given by $$[\tilde{Y}]_{p,q}(l) = \left\| \sum_{k=1}^{K} c_k \sum_{m=1}^{M} e^{-j(q\Delta_\phi - k_\phi)d_R m} \times \right.$$
$$\left. \sum_{i_s=1}^{I_s} e^{-j(l\Delta_r - (\omega_{D_k} + \omega_{B_k}))i_s T_s} \sum_{i_c=1}^{I_c} e^{-j(q\Delta_\phi - k_\phi)\chi(i_c)} e^{-j(p\Delta_D - \omega_{D_k})i_c T_c} \right\|^2$$

where the intra-chirps sampling time is denoted $T_s$, $i_s$ describes the intra-chirp sample index, $T_c$ denotes the chirp duration and the switching across chirps is denoted by the chirp index $i_c$.

In an alternate embodiment $[\tilde{Y}]_{p,q}(l)$ is computed using a three dimensional Fourier transform of new datacube where the raw signals are reordered according to $$\varphi\left(i_s, i_c, m + \frac{\chi(i_c)}{d_R}\right) = [Y]_{i_c,m}(i_s)$$

In the sparse datacube $\varphi(i_s, i_c, m) \in C^{I_s \times I_c \times MN}$, the received signals are ordered along m according to their position on the virtual array. In this embodiment, the squared filter output can be obtained using the digital fourier transform (DFT) along all dimensions of the data cube (represented by $F_{m,i_c,i_s}$):

$$[\tilde{Y}]_{p,q}(l) = |F_{m,i_c,i_s}\{\varphi(i_s,i_c,m)\}|^2.$$

Preferably, according to one aspect of the invention wherein uncorrelated PCM transitions are considered, obtaining at least an angle-Doppler ambiguity function (AF) from the receive signals further comprises obtaining at least an angle-Doppler ambiguity function (AF) from the receive signals further comprises averaging $[\tilde{Y}]_{p,q}(l)$ to obtain $$E[[\tilde{Y}]_{p,q}(l)] = \sum_{k=1}^{K} \sigma_k^2 \|f_{r_k}(l)\|^2 \|f_{\phi_k}(q)\|^2 f_\chi(q, p)$$

where $$f_\chi(q, p) = I_c^2 \left( \left\| \frac{W(\omega'_{D_k}(p))}{I_c} \right\|^2 \|\Gamma(k'_{\phi_k}(q))\|^2 + \frac{1}{I_c}(1 - \|\Gamma(k'_{\phi_k}(q))\|^2) \right)$$

and where the function $W(\omega'_{D_k}(p))$ is the DFT of the rectangular time window and $W(0)=I_c$ denotes the signal energy. Further, $k'_{\phi_k}(q) = q\Delta_\phi - k'_{\phi_k}$ and $\omega'_{D_k}(p) = p\Delta_D - \omega'_{D_k}$. Furthermore, $\Delta_\phi$, $\Delta_D$ respectively denote the resolution in angle and Doppler domains; these are design parameters. Essentially, the above equation relates the AF, on an average, to the range function ($f_{r_k}(l)$), the angle function ($f_{\phi_k}(q)$), and $f_\chi(q, p)$ denotes the coupling between the angle and Doppler. The function $f_{r_k}(l)$, will have peaks corresponding to the target k for all angle and Doppler entries (q, p). Similarly, $f_{\phi_k}(q)$ will have a peak corresponding to the angle of arrival of the target k for all (l, p). However, the term $f_\chi(q, p)$ couples angle and Doppler, thereby preventing resolvable peaks on the AF plot for Doppler. This leads to erroneous estimates of the target parameters or inability to resolve multiple targets. It should be noted, however, that $f_\chi(q, p)$ involves the PCM and not the other terms. This provides us with a degree of freedom to choose the PCM towards decoupling angle and Doppler.

Preferably according to another aspect of the invention wherein correlated PCM transitions are considered, obtaining at least an angle-Doppler ambiguity function (AF) from the receive signals further comprise obtaining at least an angle-Doppler ambiguity function (AF) from the receive signals further comprises averaging $[\tilde{Y}]_{p,q}(l)$ to obtain $$E[[\tilde{Y}]_{p,q}(l)] = \sum_{k=1}^{K} \sigma_k^2 \|f_{r_k}(l)\|^2 \|f_{\phi_k}(q)\|^2 f_\chi(q, p)$$

where $$f_\chi(q, p) = E\left[\left\| \sum_{i_c}^{I_c} e^{-jk'_{\phi_k}(q)\chi(i_c) - j\omega'_{D_k}(p)i_c T_c} \right\|^2 \right]$$

where $T_c$ denotes the chirp time. Similar to the uncorrelated case, $f_\chi(q, p)$ depends on the $\chi(i_c)$ which is used as a design parameter.

According to an aspect of the invention, the $E[[\tilde{Y}]_{p,q}(l)]$ can be controlled through the PDF ($\rho_{\chi(i_{c1})}$) and joint PDF ($\rho_{\chi(i_{c1}),\chi(i_{c2})}$) of the PCM.

According to another aspect of the invention, there is provided a system for obtaining an angle-Doppler ambiguity function (AF) for a target using multiple-input-multiple-output (MIMO) radar, the system comprising a transmit antenna array, the transmit antenna array being at least one-dimensional and having a plurality of antenna elements; and processing circuitry, coupled to the transmit antenna array, the processing circuitry being configured to carry out the method of any of claims 1 to 14 of the appended claims, or as described and illustrated herein.

The system preferably further comprises a receive antenna array coupled to the processing circuitry, the receive antenna array being at least one-dimensional and having a plurality of antenna elements.

According to another aspect of the invention, there is provided a non-transitory computer readable medium storing instructions which, when executed by processing circuitry, perform the method of any of claims 1 to 14 of the appended claims, or as described and illustrated herein.

An advantage of the invention, at least in some embodiments, is to provide enhanced low cost target detection with the objective of suppressing the angle-Doppler coupling. It considers PCM based on random spatio-temporal modulations of the transmit array followed by a matched filter processing at receiver.

A further advantage is to provide a framework for adapting these waveforms to enhance the AF at certain regions to mitigate the impact of strong targets and enhance the detection of weaker ones. Use of such waveforms leads to adaptive AF.

A further advantage is to provide for a waveform adaptation mechanism where the correlated PCM is adapted to enhance the AF in certain regions towards obtaining better detection of weak targets masked by strong targets. As mentioned above (see e.g. par. [0028]), the PDF ($\rho_{\chi(i_{c1})}$) and joint PDF ($\rho_{\chi(i_{c1}),\chi(i_{c2})}$) of the PCM are used for this exercise.

A further advantage is the ease of implementation by just using a switched transmit array and a conventional beamforming technique at the receiver.

Simulation results have proven the capability of the invention by illustrating the desired shaping of the AF based on the choice of the PDF.

In another interesting aspect of the invention, the phase center motion (PCM) is designed based on the design of the autocorrelation function to impose nulls at specific Doppler locations, indexed by $\omega'_{D_k}(q)$.

Another interesting aspect of the invention is the use of the method adaptively. One application of this is to detect a weak target in the vicinity of a strong target. Once a strong target had been detected, the PCM can be adapted to suppress it by minimizing the corresponding $f_\chi(q, p)$ in equation (10) to suppress detected target. The process can be continued by suppressing detected targets in the scene and enhancing the illumination of the weaker targets.

One embodiment of obtaining a auto-correlation function is to consider uncorrelated PCM with Gaussian PDF and filter it using a linear filter h( ). This leads to, $$f_\chi(q, p) = I_c^2 \left| \left| \Gamma(k'_{\phi_k}(q)) \right| \right|^2 \left( \left\| \frac{W(\omega'_{D_k}(p))}{I_c} \right\|^2 + \left\| \frac{W(\omega'_{D_k}(p))}{I_c} \right\|^2 * \sum_n \frac{\sigma_\chi^2 k'_{\phi_k}{}^{2n}(q)}{n!} \left( [F[h^n(\tau)]]_{\omega'_{D_k}(q)} \right) \right)$$

which shows that the PCM shaping filter h($\tau$) plays a role in determining the AF for the case of Gaussian PCM.

In one embodiment, the choice of the filter h(n)=cos($\omega_0$n) for some frequency $\omega_0$.

In one embodiment, the system adaptation can take the following steps
- If there is no knowledge about the target scenario, it has to be assumed a worst case with no prior knowledge, where targets could be located anywhere and have the same RCS. It can be shown that for such a scenario, the white PCM provides the best SINR. Thus, h($\tau$) is chosen as an impulse.
- When knowledge about the scene is gathered by applying a matched filter threshold, an estimate of some target positions and their reflected power typically corresponding to strong targets, are determined. The responses corresponding to ones with weak backscatter may be missed by the threshold algorithm.

This estimate can be used for signal design and the filter coefficients h($\tau$) can be adjusted to optimize the SINR in regions where it is poor.

BRIEF DESCRIPTION OF THE DRAWINGS

Further details and advantages of the present invention will be apparent from the following detailed description of not limiting embodiments with reference to the attached drawing, wherein.

DESCRIPTION OF PREFERRED EMBODIMENTS

In the following, like numerals will be used to indicate like elements.

I. INTRODUCTION

Embodiments of the present invention involve one or more of the following considerations. It should be noted that the presented FMCW implementation serves only for illustration purposes and the PCM principle is compatible with other radar waveforms such as OFDM or PMCW.

A phase center motion is nothing other than a space time code of a certain signal. Therefore, one signal can have different space time codes. It can be shown that these space time codes can be orthogonal even though the excitation signal of the antenna elements is the same. The space time code can be expressed by trajectories within the antenna array, therefore, orthogonality in trajectory is introduced as a new degree of freedom.

A random Phase Center Motion (PCM) technique is presented herein, based on Frequency Modulated Continuous Wave (FMCW) radar, in order to suppress the angle-Doppler coupling in Time Division Multiplex (TDM) Multiple-Input-Multiple-Output (MIMO) radar when employing sparse array structures. Embodiments exploit an apparently moving transmit platform or PCM due to spatio-temporal transmit array modulation. In particular, the techniques involve a framework utilizing a random PCM trajectory. The statistical characterization of the random PCM trajectory is devised, such that the PCM and the target motion coupling is minimal, while the angular resolution is increased by enabling the virtual MIMO concept. In more detail, embodiments of the present invention involve sidelobe suppression approaches within the angle-Doppler Ambiguity Function (AF) by introducing a phase center probability density function within the array. This allows for enhanced discrimination of multiple targets. Simulation results demonstrate the suppression angle-Doppler coupling by more than 30 dB, even though spatiotemporal transmit array modulation is done across chirps which leads usually to strong angle-Doppler coupling Further, the temporal characteristics of the PCM, governed by the filtering operation, provide additional degrees of freedom for the adaptive design of AF. In particular, the correlation of PCM can be used to obtain desired AF in regions of interest towards enhancing the detection of weak targets in addition to the improvement in the angle-Doppler coupling.

In contrast to the deterministic PCM in the above-references Hammes et al. paper, the approach used here develops a framework for PCM trajectories where the phase center position varies randomly in time. Embodiments of the present invention utilize random PCM trajectories whose statistical characterization is based on uncorrelated transitions. Such a PCM implies high trajectory fluctuations, which are different from smooth target trajectories, due to the inertia of real targets. Therefore, PCM and the target trajectory can be decoupled due to their independent trajectories. In addition to the uncorrelated transitions, the PCM is described by the Probability Density Function (PDF). An interesting aspect is that the PDF impacts the angle-Doppler determination. Embodiments of the present invention involve the exploitation of the PDF to enhance target discrimination. Since the PCM trajectory parameters are known, a trajectory matched filter bank can be employed in order to extract Doppler and angular information. Embodiments of the present invention involve the development of a matched filter operating on the FMCW samples, chirps and the number of antennas to provide multiple target information. Throughout, the operator $\|\cdot\|$ is used for the $l_2$-norm. $[\cdot]_{\eta,\gamma}$ defines a matrix entry with row index $\eta$ and column index $\gamma$. The notation $[\cdot]_\eta$ indicates a column vector element with the index $\eta$. The $E\{\cdot\}$ is the expectation operator. The symbol $\mathbb{C}$ defines the set of complex numbers.

II. SYSTEM MODEL

Figure 1:
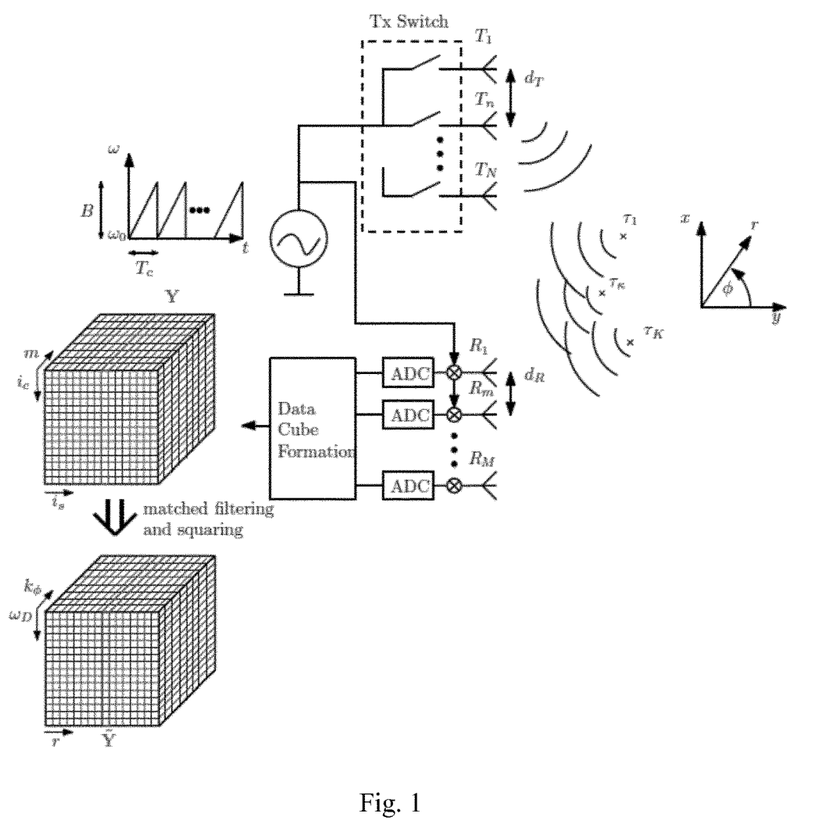
FIG. 1 shows schematically a System Model for a FMCW PCM system according to an embodiment.

FIG. 1 shows schematically a System Model for a FMCW PCM system according to an embodiment. The local oscillator output is a consecutive set of FMCW chirps, where each chirp is radiated in a random alternating fashion with just one transmit antenna element being active at a time. The collocated transmit antenna elements are mounted along the x-axis with an inter-element spacing of $d_T$ and a total number of N antenna elements. From the sparse transmit array structure the chirp sequence is propagating towards K multiple, in general moving, point scatters.

The back-scattered signal, which is a superposition of single target back-scatters, is captured by the dense receive array. The receive array contains M collocated antenna elements with an inter-element spacing of $d_R$. Due to the FMCW scheme, the captured signal at each receiver is down-mixed by an instantaneous local oscillator signal and subsequently converted to the digital domain. The accumulated data is rearranged in a data-cube, where the first dimension contains the intra-chirp samples, the second dimension denotes the inter-chirp samples and the third dimension refers to the data from each receive antenna element. A matched filter is applied to each dimension in order to compress the continuous wave such that the range, angle and Doppler information can be extracted. The matched filter output squaring provides the range-angle-Doppler AF.

A. Transmitted Signal

The transmitted signal $u \in \mathbb{C}^{l_c \times 1}$ consists of $l_c$ FMCW chirps, while each chirp contains a different phase center position $\chi(i_c)$ at the transmit array. The switching across chirps is denoted by the chirp index $i_c$, $$[u(t)]_{i_c} = e^{jk_\phi \chi(i_c)} e^{j\left(\omega_0 t + \frac{B}{2T_c} t^2\right)}$$

Since the antenna elements are assumed to be point-like isotropic radiators mounted in x-direction, the propagation vector for x-direction is denoted as $k_\phi = k_0 \sin(\phi)$, where $k_0$ is the free space wave number and j the complex number. The FMCW parameters are the center angular frequency $\omega_0$, the angular bandwidth B and the chirp duration $T_c$.

B. Received Signal

The received signal is sampled by the intra-chirps sampling time denoted by $T_s$, while $i_s$ describes the intra-chirp sample index. If the signal is reflected by multiple point-like moving targets, the captured down-mixed and digital converted received signals are written in matrix notation $Y \in \mathbb{C}^{l_c \times M}$, $$[Y]_{i_c,m}(i_s) = \sum_{k=1}^{K} c_k e^{jk_\phi d_R m} e^{jk_\phi \chi(i_c)} e^{j(\omega_{D_k}(i_c T_c + i_s T_s) + \omega_{B_k} i_s T_s)}$$

The complex constant $$c_k = \sigma_k e^{\left(j(\omega_0 + \omega_{D_k})t_k + j\frac{B}{2T_c}t_k^2\right)}$$

which is a result of the FMCW down-mixing procedure and propagation effects, contains the κ-th target radar cross section together with the signal attenuation $\sigma_\kappa$. The propagation delay $$t_k = \frac{2r_k}{c_0}$$

includes the target range $r_k$ and speed of light $c_0$. The κ-th target moves continuously during the coherent processing interval, therefore the Doppler shift $\omega_{D_k}$ appears in the entire sequence considered by the term $\omega_{D_k}(i_c T_c + i_s T_s)$. The sampling time and the corresponding sample index are denoted by $T_s$ and $i_s$, respectively. The FMCW associated angular beat frequency is defined as $$\omega_{b_k} = 2\frac{B}{T_c}\frac{r_k}{c_0}.$$

C. Trajectory Matched Filter

After the formation of data-cube, a three dimensional matched filter is applied with a subsequent squaring. Since the matched filter correlates the received signal with its conjugate complex signal, the matched filter operation in is and m direction has the form of a DFT. The matched filter for the inter-chirp dimension $i_c$ has to extract Doppler and angular information simultaneously. Further, during the extraction, the angular information in $i_c$ direction has to be synchronized with the angular information in m direction. The synchronization problem is solved by zero padding in m dimension such that the spatial DFT wave number resolution is proportional to the inverse virtual array size. While p denotes the index for the Doppler dimension, the index q denotes the angular dimension. The angular resolution depends on the virtual array size $$\Delta_\phi = \frac{4\pi}{MN\lambda}$$

(D. Bliss, K. torsythe, G. Fawcett, "MIMO Radar: Resolution, Performance, and Waveforms," in Proceedings of ASAP, 2006). The Doppler resolution is proportional to the inverse coherent processing interval $$\Delta_D = \frac{2\pi}{I_c T_c}$$

(P. Setlur and M. Rangaswamy, "Waveform Design for Radar STAP in Signal Dependent Interference," IEEE Trans. Signal Process., vol. 64, no. 1, January 2016) and the range resolution is defined as $$\Delta_r = \frac{2\pi}{T_c}.$$

By reformulating the range resolution expression, the actual limiting factor for resolution is the angular bandwidth B. Furthermore, (3) illustrates the range migration due to range-Doppler coupling in the FMCW radar. The squared output of the matched filter $[\tilde{Y}]_{p,q}(l)$ for the p-th Doppler bin, q-th angular bin and l-th range bin is, $$[\tilde{Y}]_{p,q}(l) = \left\| \sum_{k=1}^{K} c_k \sum_{m=1}^{M} e^{-j(q\Delta_\phi - k_\phi)d_R m} \times \sum_{i_s=1}^{I_s} e^{-j(l\Delta_r - (\omega_{D_k} + \omega_{B_k}))i_s T_s} \sum_{i_c=1}^{I_c} e^{-j(q\Delta_\phi - k_\phi)\chi(i_c)} e^{-j(p\Delta_D - \omega_{D_k})i_c T_c} \right\|^2 \quad (3)$$

Further, it can be shown, if two targets $\kappa_1$ and $\kappa_2$ are in different resolution bins, the cross terms, which are outputs of the squaring, can be neglected. Therefore the squared matched filter output can be formulated as a superposition of targets, $$[\tilde{Y}]_{p,q}(l) = \sum_{k=1}^{K} \sigma_k^2 \|f_{r_k}(l)\|^2 \|f_{\phi_k}(q)\|^2 \left\| \sum_{i_c=1}^{I_c} e^{-jk'_{\phi_k}(q)\chi(i_c)} e^{-j\omega'_{D_k}(p)i_c T_c} \right\|^2 \quad (4)$$

Conveniently, the range and angular filter response are defined as $$f_{r_k}(l) = \sum_{i_s=1}^{I_s} e^{-j(l\Delta_r - (\omega_{B_k} + \omega_{D_k}))i_s T_s} \text{ and } f_{\phi_k}(q) = \sum_{m=1}^{MN} e^{-j(q\Delta_\phi - k_{\phi_k})d_R m}.$$

Due to the squaring operation the phase term from FMCW processing vanishes and just the $\kappa$-th target attenuation factor $\sigma_\kappa$ is left. Moreover, for the sake of convenience, the angular coordinates are transferred to $k'_{\phi_\kappa}(q) = q\Delta_\phi - k_{\phi_\kappa}$ and the Doppler coordinates are transferred as well, to $\omega'_{D_\kappa}(p) = p\Delta_D - \omega_{D_\kappa}$. Equation (4) can be further simplified by assuming a random process for the PCM $\chi(i_c)$. A detailed derivation for a white random process with arbitrary PDF is demonstrated in Section III

III. RANDOM PHASE CENTER MOTION: UNCORRELATED TRANSITIONS

Unlike a deterministic function for PCM as considered in [7], the PCM $\chi(i_c)$ is considered as a random process. In particular, let $\rho_{\chi(i_c)}$ denote the PDF of $\chi(i_c)$. One phase center position is further assumed to be independent of the other, leading to Dirac-like autocorrelation response $E\{\chi(i_{c1})\chi(i_{c2})\} = \delta(i_{c1} - i_{c2})$. The PDF of arbitrary shape is assumed to be time independent. This coupled with the correlation assumption leads to a wide sense stationary characterization of $\chi(i_c)$.

Figure 2:
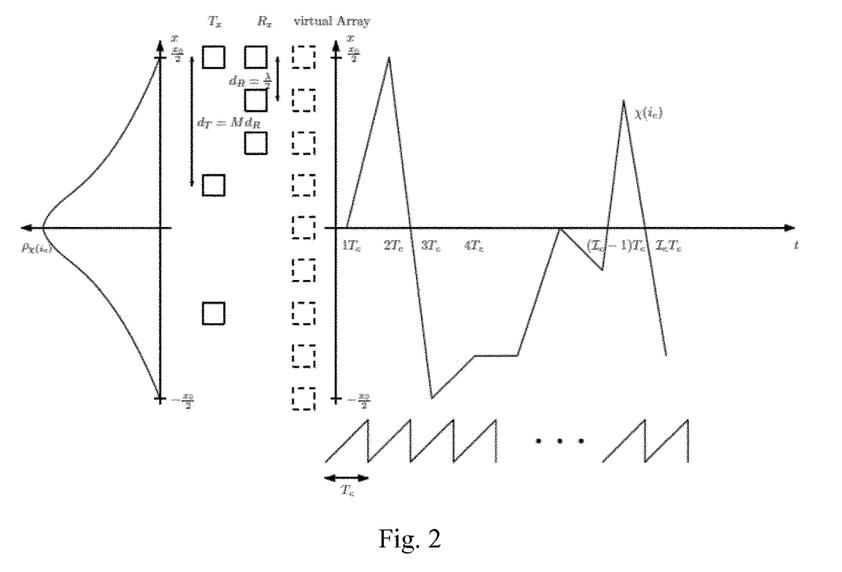
FIG. 2 shows random PCM properties with the PCM PDF (left side) and the uncorrelated phase center positions (right side) used in an embodiment.

FIG. 2 illustrates the relationship of random process and PCM. As discussed in the above-mentioned Hammes et al. paper, the phase center can assume any real position within the virtual array by appropriate modulation scheme. Thus, in general, the PDF $\rho_{\chi(i_c)}$ is continuous; however, the PDF is discrete for scenarios involving antenna switching.

Since the PCM is a white random process, (4) considers an estimate of the expected matched filter output or angle-Doppler AF. Based on this, for further analysis, the average value of (4) is considered, $$E\big[[\tilde{Y}]_{p,q}(l)\big] = \sum_{k=1}^{K} \sigma_k^2 \|f_{r_k}(l)\|^2 \|f_{\phi_k}(q)\|^2 E\left\{ \left\| \sum_{i_c=1}^{I_c} e^{-jk'_{\phi_k}(q)\chi(i_c)} e^{-j\omega'_{D_k}(p)i_c T_c} \right\|^2 \right\} \quad (5)$$

The consideration of the latter term in (5) leads to an expression of a rectangular windowed periodogram, $$f_\chi(q, p) = E\left\{ \left\| \sum_{i_c=1}^{I_c} e^{-jk'_{\phi_k}(q)\chi(i_c)} e^{-j\omega'_{D_k}(p)i_c T_c} \right\|^2 \right\} = \\ \sum_{i_{c1}=1}^{I_c} \sum_{i_{c2}=1}^{I_c} E\left\{ e^{-jk'_{\phi_k}(q)(\chi(i_{c1}) - \chi(i_{c2}))} \right\} e^{-j\omega'_{D_k}(p)(i_{c1} - i_{c2})T_c} = \\ \sum_{i=-I_c}^{I_c} \left(1 - \frac{|i|}{I_c}\right) r(i) e^{-j\omega'_{D_k}(p)i T_c} \quad (6)$$

The autocorrelation function r(i) depends on the relative time shift $i = i_{c1} - i_{c2}$. Since the PDF $\rho_{\chi(i_c)}$ of $\chi(i_c)$ is known, the autocorrelation function can be evaluated analytically as, $$r(i) = \\ r(i_{c1} - i_{c2}) = E\left\{ e^{-jk'_{\phi_k}(q)(\chi(i_{c1}) - \chi(i_{c2}))} \right\} = \delta(i) - (1 - \delta(i))\|\Gamma(k'_{\phi_k}(q))\|^2 \quad (7)$$

The function $\Gamma(k'_{\phi_\kappa}(q))$ can be identified as a radiation characteristic for the time modulated array. Furthermore, $\Gamma(k'_{\phi_\kappa}(q))$ is a function of the PDF $\rho_{\chi(i_c)}$. This can also be seen as the characteristic function of the PCM evaluated at $k'_{\phi_\kappa}(q)$, $$\Gamma(k'_{\phi_k}(q)) = E\left\{e^{-jk'_{\phi_k}(q)\chi(i_{c1})}\right\} = \int_{-\infty}^{\infty} \rho_\chi(i_{c1}) e^{-jk'_{\phi_k}(q)\chi(i_{c1})} d\chi(i_{c1}) \quad (8)$$

The result matches to array factor investigations (see (i) S. Yang, Y.-B. Gan, P. Khiang Tan, "Linear Antenna Arrays With Bidirectional Phase Center Motion," IEEE Trans. Antennas Propag., vol. 53, no. 5, April 2005, (ii) G. Li, S. Yang, Z. Nie, "Direction of Arrival Estimation in Time Modulated Linear Array With Unidirectional Phase Center Motion," IEEE Trans. Antennas Propag., vol. 58, no. 4, 2010, (iii) S. Yang, Y.-B. Gan, A. Qing, "Sideband Suppression in Time-Modulated Linear Arrays by the Differential Evolution Algorithm," IEEE Antennas Wireless Propag. Lett., vol. 1, 2002, (iv) L. Poli, P. Rocca, L. Manica, A. Massa, "Pattern synthesis in timemodulated linear array through pulse shifting," IET Microwave, Antennas and Propagation, February 2009 and (v) J. Guo, S. Yang, S.-W. Qu, Jun Hu, Zaiping Nie, "A Study on Linear Frequency Modulation Signal Transmission by 4-D Antenna Arrays," IEEE Trans. Antennas Propag., vol. 63, no. 12, December 2015), where the array factor is the Fourier Transform over the antenna weightings. Therefore, the PDF becomes a design parameter of the ambiguity function shape in angular direction and can be exploited for sidelobe suppression.

The periodogram $f_\Psi(q, p)$ can be further evaluated, $$f_\chi(q,p) = \|W(\omega'_{D_k}(p))\|^2 \|\Gamma(k'_{\phi_k}(q))\|^2 + W(0)(1-\|\Gamma(k'_{\phi_k}(q))\|^2) = \quad (9)$$

$$I_c^2 \left( \left\|\frac{W(\omega'_{D_k}(p))}{I_c}\right\|^2 \|\Gamma(k'_{\phi_k}(q))\|^2 + \frac{1}{I_c}(1-\|\Gamma(k'_{\phi_k}(q))\|^2)\right)$$

The function $W(\omega'_{D_k}(p))$ is the DFT of the rectangular time window and $W(0)=I_c$ denotes the signal energy. In order to construe the result of (9), the function $W(\omega'_{D_K}(p))$ is normalized. Since the first term $$\left\|\frac{W(\omega'_{D_k}(p))}{I_c}\right\|^2 \|\Gamma(k'_{\phi_k}(q))\|^2$$

has its maximum at the target position with an amplitude value of one, the latter term $$\frac{1}{I_c}(1-\|\Gamma(k'_{\phi_k}(q))\|^2)$$

has a lower amplitude. Further, the latter term is a parasitic effect of the chosen random PCM approach. If the latter term vanishes, the angle-Doppler coupling is no longer present and therefore for a large number of chirps, the angle-Doppler coupling is minimal as it is demonstrated through simulations in Section V "SIMULATION RESULTS".

IV. RANDOM PHASE CENTER MOTION: CORRELATED TRANSITIONS AND AF ADAPTATION

In this case, we do not consider uncorrelated PCM transitions. While the general expression for correlation in equation (6) holds, the simplification in (7) does not. Using Fourier Transforms, equation (6) can be re-written as, $$f_\chi(q,p) = \left|W(\omega'_{D_k}(p))\right|^2 * [F[r_\chi(i)]]_{\omega'_{D_k}(q)} \quad (10)$$

where $W(\omega'_{D_K}(p))$ defined in [0059] earlier, * denotes the convolution operation and $$[F[r_\chi(i)]]_{\omega'_{D_k}(p)}$$

is the Fourier Transform of the correlation sequence evaluated at $\omega'_{D_k}(p)$. Thus, the coupling term is dependent on the rectangular window function, $W(\omega'_{D_k}(p))$, and the Fourier transform of the correlation function of PCM.

Using (10) and (6) in (5), and, for the sake of argument, focusing on the k=1 target, it can be seen that the $\|f_{r_\chi}(1)\|^2$, $\|f_{\Phi_\kappa}(q)\|^2$ have peaks at the range and angle of arrival corresponding to the first target. While the $|W(\omega'_{D_k}(p))|^2$ in $f_\chi(q, p)$ peaks at the Doppler corresponding to the first target, the operation in (10), spreads this peak based on angle (index q). In the presence of strong targets, such a spread leads to significant sidelobes that mask the peak of weaker targets One embodiment of controlling this interference is through the use of white PCM as discussed in Section III, whence the coupling between angle and Doppler results in a constant side-lobe floor. When this side-lobe floor is also high, the correlated PCM provides additional degrees of freedom to alter the side lobe so that they can be moved away from particular locations where a weak target can be masked. Since such a shaping of the side-lobe depends on the strength and location of the target detected, it cannot be fixed apriori.

It is possible to shape the side-lobes in the AF (output of the receiver matched filter) using PCM by controlling its autocorrelation function. The correlation function of the PCM is dependent on the PDF ($\rho_{\chi(i_{c1})}$) and joint PDF ($\rho_{\chi(i_{c1}),\chi(i_{c2})}$) of the PCM. In particular, it is possible to put nulls at selected $\omega'_{D_K}(q)$ so that the $\kappa$ th target is suppressed. Indeed, when the suppressed target is a strong one, it is possible to ascertain the presence of other targets in the vicinity.

The process can be made adaptive. Once a strong target had been detected, the PCM can be adapted to suppress it by minimizing the corresponding $f_\chi(q, p)$ in equation (10) to detect a weak target in the vicinity of the suppressed target. The process can be continued by suppressing detected targets in the scene and enhancing the illumination of the weaker targets.

Several possibilities towards design of $r_\chi(i)$ can be found. One embodiment is to consider uncorrelated PCM with Gaussian PDF and filter it using a linear filter h( ). For such a scheme, equation (7) reduces to, $$r_\chi(\tau) = \quad (11)$$

$$E\left\{e^{-jk'_{\phi_k}(q)(\chi(i_{c1})-\chi(i_{c2}))}\right\} = \int\int \frac{1}{2\pi\sqrt{det(R_h(\tau))}} e^{-\frac{(\chi-\mu)^T R_h(\tau)(\chi-\mu)}{2}}$$

Where $\chi=[\chi(i_{c1}), \chi(i_{c2})]^T$, $\mu=E[\chi]$ and $R_h(\tau)$ is the correlation matrix of $\chi$ and takes the form, $$R_h(\tau) = \sigma_\chi^2 \begin{bmatrix} 1 & h(\tau) * h(\tau) \\ h(\tau) * h(\tau) & 1 \end{bmatrix}$$

where $\sigma_\chi^2$ is the variance of $\chi$. After some manipulations, it can be shown that, $$f_\chi(q, p) = I_c^2 \, ||\Gamma(k'_{\phi_K}(q))|^2 \left( \left\| \frac{W(\omega'_{D_K}(p))}{I_c} \right\|^2 + \left\| \frac{W(\omega'_{D_K}(p))}{I_c} \right\|^2 * \sum_n \frac{\sigma_\chi^2 k'_{\phi_K}{}^{2n}(q)}{n!} \left( [F[h^n(\tau)]]_{\omega'_{D_K}(q)} \right) \right) \quad (12)$$

Thus equation (12) indicates that the PCM shaping filter $h(\tau)$ plays a role in determining the AF for the case of Gaussian PCM.

If there is no knowledge about the target scenario, it has to be assumed a worst case with no prior knowledge, where targets could be located anywhere and have the same RCS. It can be shown that for such a scenario, the white PCM provides the best SINR. Thus, $h(\tau)$ is chosen as an impulse.

When knowledge about the scene is gathered by applying a matched filter threshold, an estimate of some target positions and their reflected power typically corresponding to strong targets, are determined. The responses corresponding to ones with weak backscatter may be missed by the threshold algorithm.

This estimate can be used for signal design and the filter coefficients $h(\tau)$ can be adjusted to optimize the SINR in regions where it is poor.

An analytical approach to the identification of these regions involves computing the clutter covariance matrix $R_C$ wherein all the detected targets are considered as clutter. The choice of $h(\tau)$ is to ensure that $s_d^H R_C s_d$ is minimized where $s_d$ is the assumed direction of the desired signal and the superscript H denotes complex conjugation and transposition operations. In fact, $s_d = a_{T,K} \otimes a_{R,K}$, where $a_{T,K}$ is a $I_c \times 1$ column vector with the ith element being $$e^{j(\omega_{D_K}(i_c T_c) + k_\phi \chi(i_c))}$$

and $a_{R,K}$ is a M×1 vector with the m th element being $e^{jk_\phi d_R m}$

The aforementioned process allows for a better estimation of weaker target contributions to $R_C$. The process is repeated with the updated until further updates do not add significantly to existing $R_C$.

V. SIMULATION RESULTS

Single Target Simulation Results: The simulation is carried out with N=4 transmit antennas and M=4 receive antennas, mounted in a collocated manner as depicted in FIG. 2, such that the virtual MIMO array length is maximal. The FMCW chirp duration is set to =10 μs, while the carrier frequency is $f_0$=77 GHz and the angular bandwidth B=207 MHz. If two targets are present, the targets are at the same range bin in a distance of r=10 m. The same distance r=10 m is set for the single target simulation.

Figure 3:
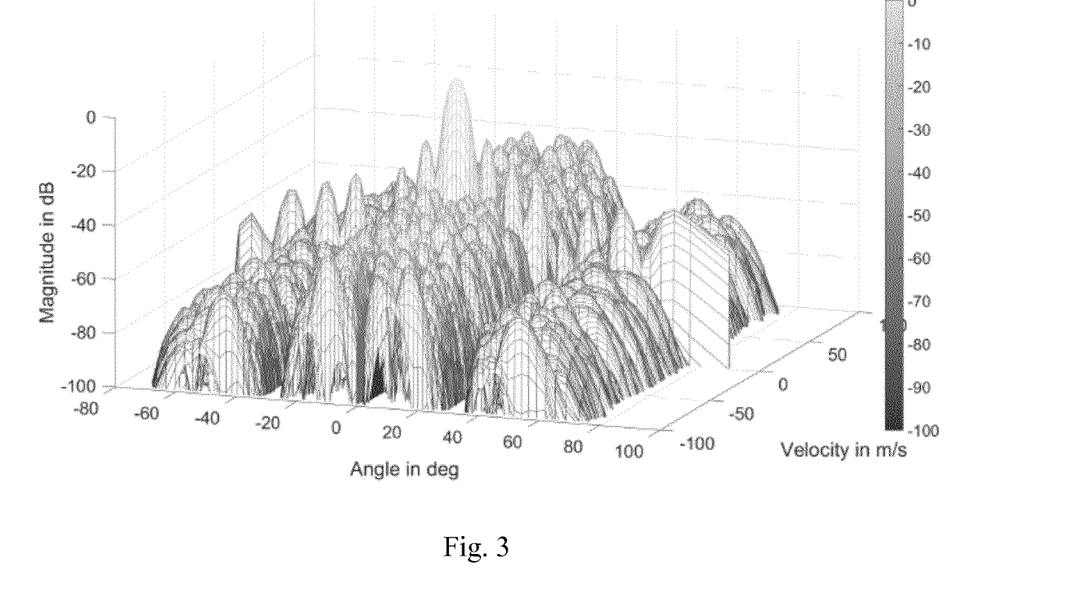
FIG. 3 shows results in the form of an Angle-Doppler AF for single target with SNR=10 dB, Ic=512 and uniform PDF, obtained using an embodiment.
Figure 4:
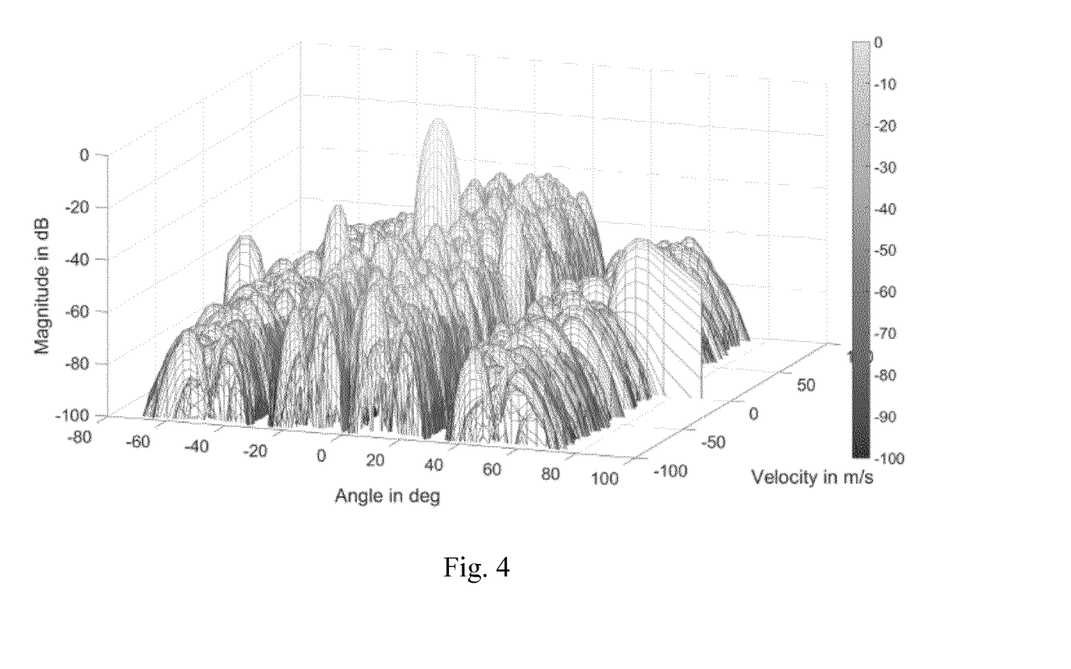
FIG. 4 shows results in the form of an Angle-Doppler AF for single target with SNR=10 dB, Ic=512 and Gaussian PDF, obtained using an embodiment.
Figure 8:
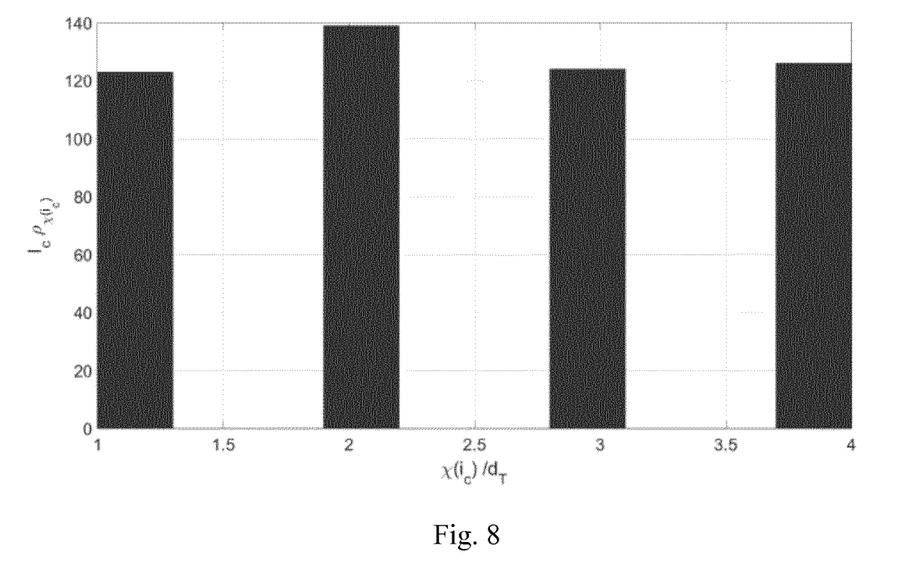
FIG. 8 shows a uniform discrete PDF for Ic=512 chirps, in an embodiment.
Figure 9:
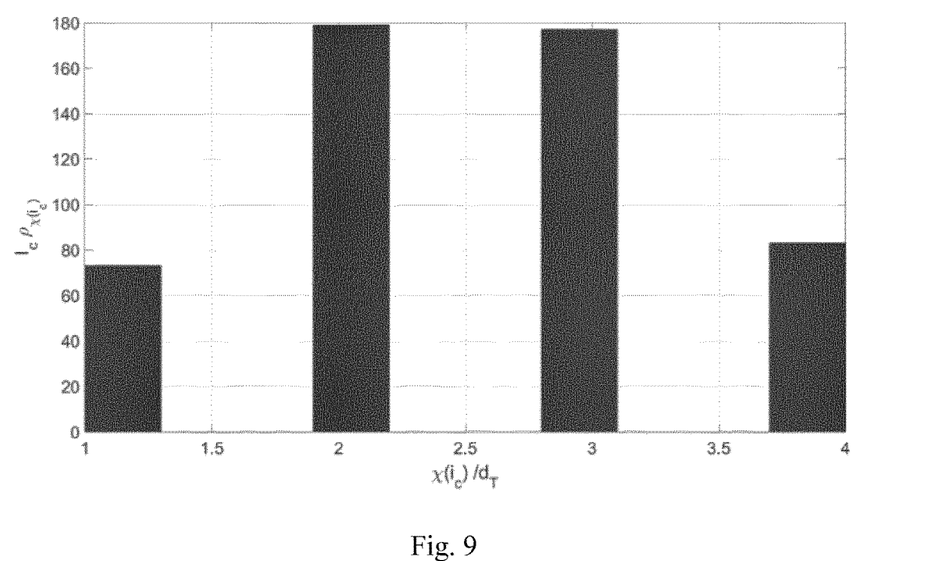
FIG. 9 illustrates a Gaussian discrete PDF for Ic=512 chirps, in an embodiment.

FIG. 3 illustrates the sinus cardinal like characteristic of the main lobe and its sidelobes. This sinus cardinal characteristic arises from the uniform PDF, therefore the resolution is maximal, while the sidelobes are high. As a consequence, if the PDF is replaced by a Gaussian distribution, the resolution decreases and the sidelobes are suppressed, as it is illustrated in FIG. 4. The uniform and Gaussian PDF are depicted in FIG. 8 and FIG. 9, respectively. Both PDF's are discrete, which illustrates the switching of the transmit array.

Figure 5:
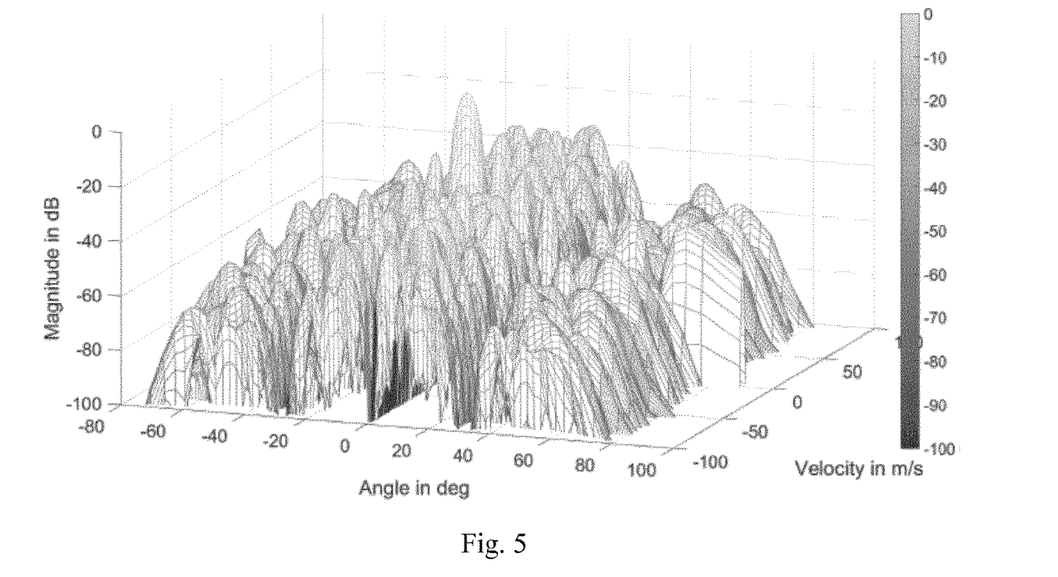
FIG. 5 shows results in the form of an Angle-Doppler AF for single target with SNR=10 dB, Ic=128 and rectangular PDF, obtained using an embodiment.
Figure 6:
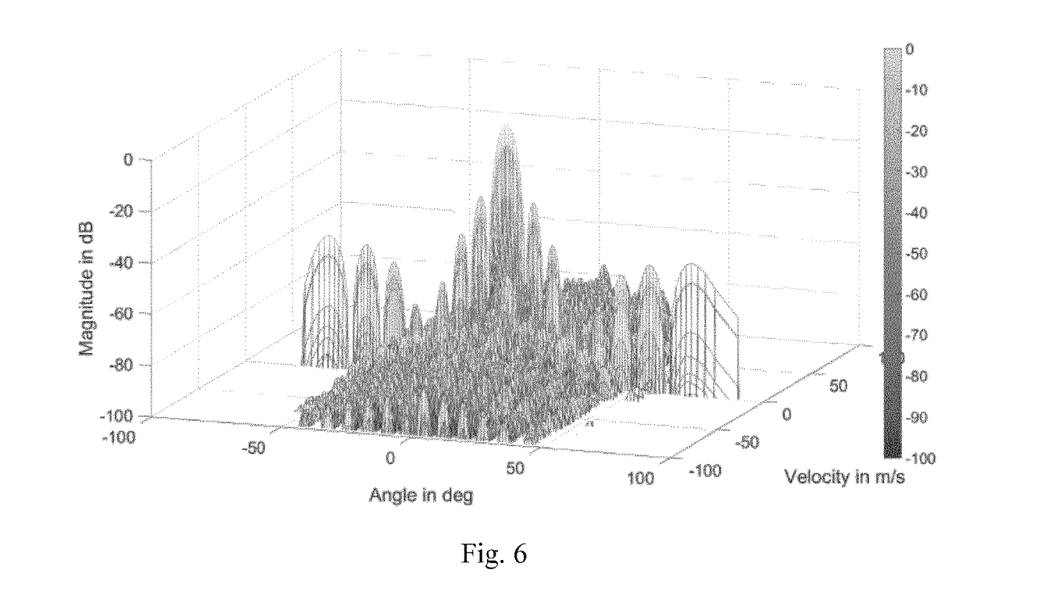
FIG. 6 shows results in the form of an Angle-Doppler AF for single target with SNR=10 dB and Ic=512 using one transmitter and 16 receivers by applying conventional beamforming.

Another degree of freedom by the proposed method is the choice of number of chirps, as it increases the sidelobe floor of the AF. The AF in FIG. 5 has a higher sidelobe floor in comparison to the AF in FIG. 3. As a result, as the number of chirps is increased, the influence of sidelobe floor on target detection decreases, because the sidelobes perturb the target detection much more than the sidelobe floor. Therefore, for a high number of chirps, the AF in FIG. 3 performs similar in terms of sidelobes and resolution compared to the filled array case. This is clearly shown in FIG. 6, where the performance of the proposed scheme is similar to that of filled array with 16 elements (having the same resolution as the considered virtual MIMO array, but with only 8 elements in total). For the filled array, beamforming is undertaken at the receiver.

Figure 7:
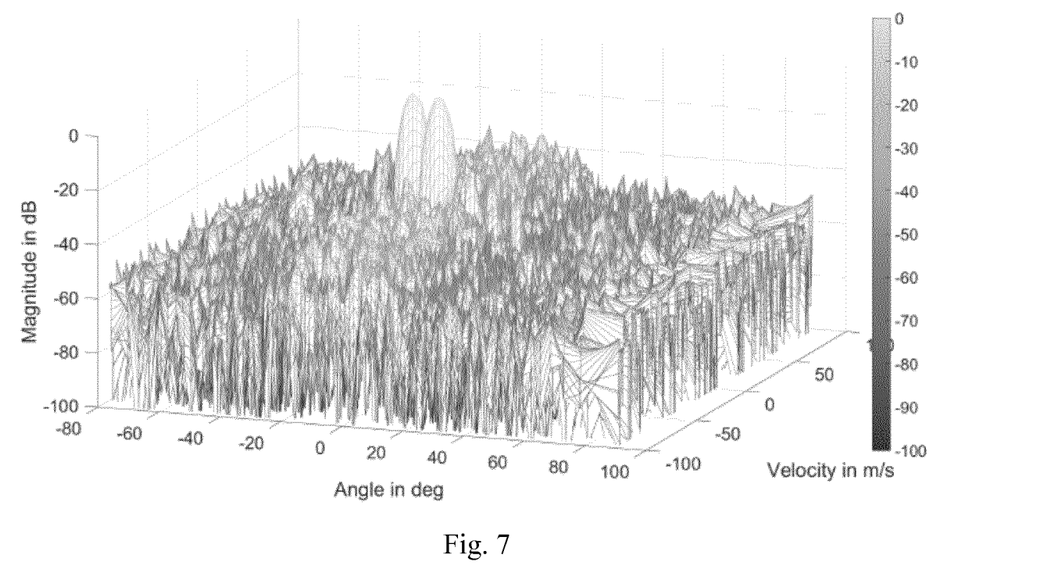
FIG. 7 shows results in the form of an Angle-Doppler AF for two target with SNR=0.20 dB, Ic=512 and uniform PDF, obtained using an embodiment.

FIG. 7 illustrates the method for a low Signal to Noise Ratio (SNR) in a multiple target scenario. The proposed matched filter approach enhances the detection performance for close proximity targets.

Multiple Target Simulations: The simulation is carried out in co-located 4 transmit and 4 receive MIMO configuration, where the four receive antenna elements are mounted along the x-direction with an inter-element spacing of $$d_R = \frac{\lambda}{2}$$

and the four transmit antenna elements are mounted along the same axis, but with an inter-element spacing of $d_T = 4 \, d_R$ to achieve the maximum virtual array length. The center frequency is set to 77 GHz leading to a free space wavelength of λ=3.9 mm. The intrapulse modulation scheme is a Frequency Modulated Continuous Wave (FMCW) with a total operating bandwidth of B=250 MHz and CW pulse length of 10 μs. The total number of CW pulses, in a coherent processing interval, is set to 512. The Signal to Noise Ratio (SNR) is defined as 0 dB. All simulation results are based on a two target configuration at an iso-range of $r = r_1 = r_2 = 10$m, the radial velocities $$r_1 = 0 \frac{m}{s}, v_2 = 48.7 \text{ m/s}$$

and the angular positions are $\phi_1 = 0°$, $\phi_2 = 5°$. Further, target one is assumed to have the weak backscatter with a RCS of 1 m$^2$, while the target two has much larger RCS of 50 m$^2$.

In these simulations, $h(\tau) = \cos(\omega_0 \tau)$ and the frequency $\omega_0$ is used as a design parameter. It should be noted that the choice of $h(\tau)$ is one of the several possibilities.

Figure 10:
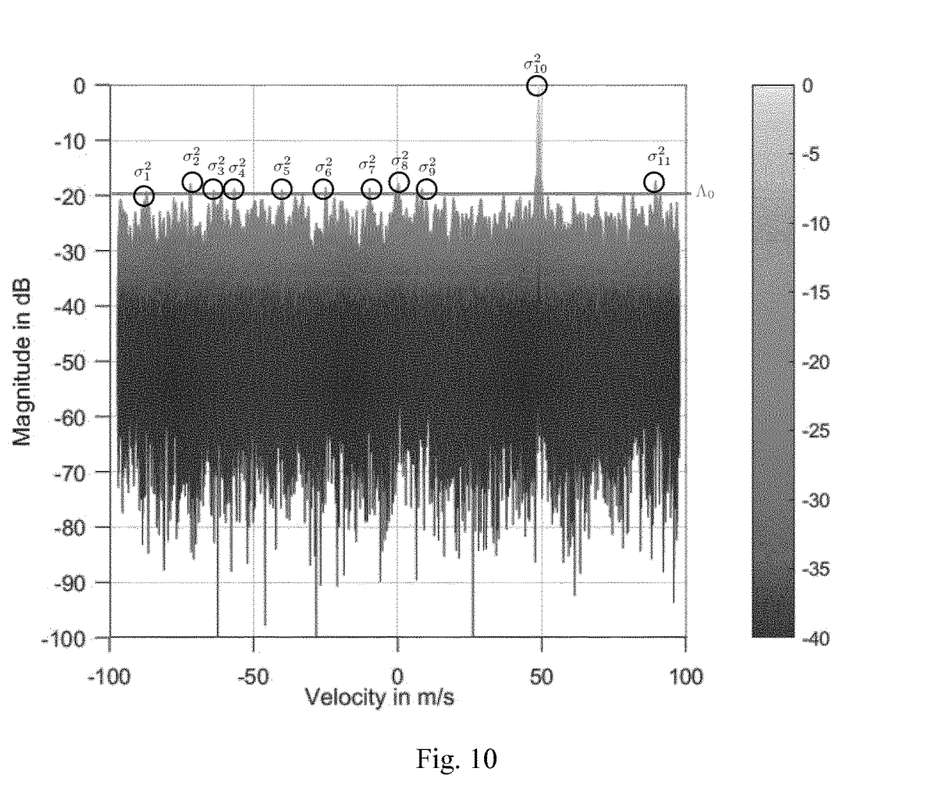
FIG. 10 illustrates the Doppler plane projection of the AF for a PCM with uncorrelated transitions.
Figure 11:
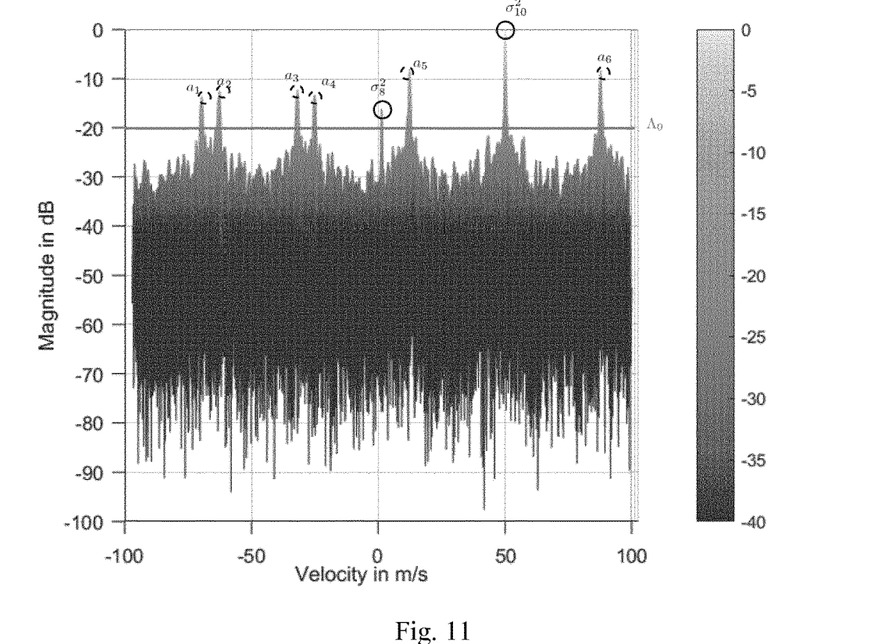
FIG. 11 shows Doppler plane projection of the AF for PCM with correlated transitions.

FIG. 10 shows the Doppler plane projection of the angle-Doppler ambiguity function for a white random PCM. The strong RCS target disturbs the weak RCS target, leading to 9 false alarms FIG. 11 shows Doppler plane projection of the angle-Doppler ambiguity function for a colored random PCM. The two targets can be clearly resolved while the six grating lobes $\alpha_*$ appear in between the two targets.

Figure 12:
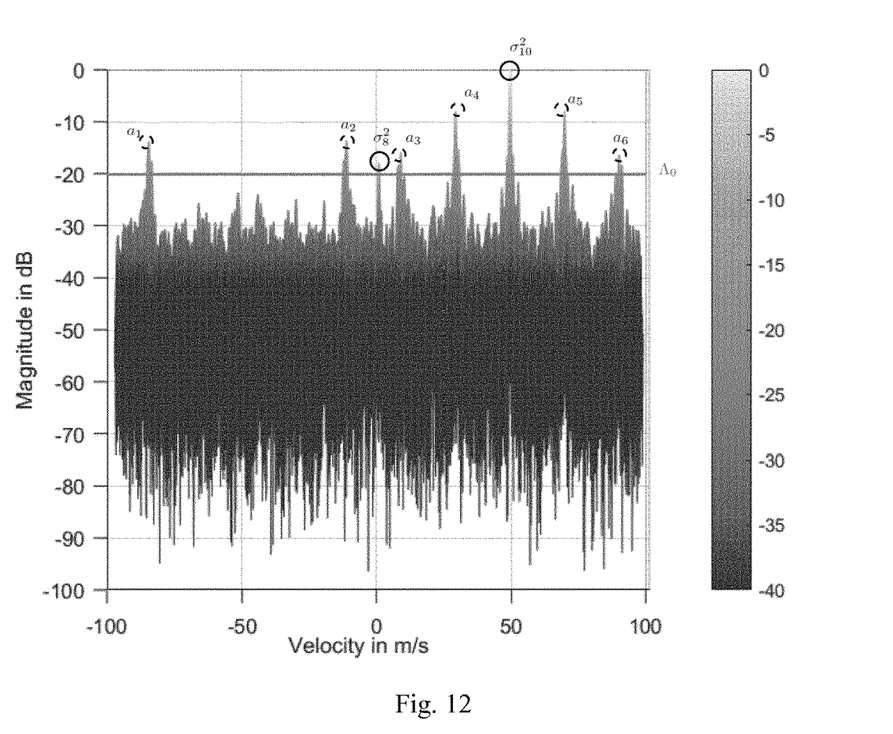
FIG. 12 shows Doppler plane projection of the AF for PCM with correlated transitions with a different window function than FIG. 11.

FIG. 12 shows Doppler plane projection of the angle-Doppler ambiguity function for a colored random PCM. The two targets can be clearly resolved while the six grading lobes α∗ appear in between the two targets.

Finally, the following table compares the proposed White PCM and Colored PCM (with uncorrelated and correlated transitions respectively) with traditional Frequency Division Multiplexing (FDM, S. Appel, D. Berges, D. Mueller, A. Ziroff, M. Vossiek, "MIMO FMCW Reader Concept for Locating Backscatter Transponders," IEEE Transactions on Microwave Theory and Techniques, vol. 64, no. 9, September 2016). and the Time Division Multiplexed (TDM) MIMO (D. Zoeke, A. Ziroff, "Phase Migration Effects in Moving Target Localization Using Switched MIMO Arrays," in Proceedings of the 12th European Radar Conference, September 2015). The colored random PCM is able to adaptively enhance certain regions of the sidelobe floor, such that the performance in terms of sidelobe floor increases and becomes similar to the side lobe floor of FDM for the optimized region but maintaining all properties of enhanced resolution and unambiguous Doppler range.

|  | FDM | TDM MIMO | White Random PCM | Colored PCM |
|---|---|---|---|---|
| Range Resolution | 2.4 m | 0.6 m | 0.6 m | 0.6 m |
| Angular Resolution (degrees) | 0.4 | 0.4 | 0.4 | 0.4 |
| Unambiguous Doppler range (m/s) | 195 | 49 | 195 | 195 |
| Side Lobe floor | −35 dB | −45 dB | −30 dB | 20 dB |

VI. CONCLUSION

This disclosure provides a novel technique for enhanced low cost target detection of weak targets masked by strong reflections with the objective of suppressing the angle-Doppler coupling. It considers PCM based on random spatio-temporal modulations of the transmit array followed by a matched filter processing at receiver. The ease of implementation, by just using a switched transmit array and a conventional beamforming technique at the receiver, makes the proposed approach attractive. In addition to the ease of implementation, the method offers degrees of freedom, which act as design parameters to serve the objective. These include the PDF of the PCM which determines how often the transmission takes place from a given antenna as well as the nature of transitions from one antenna to the other (being correlated or otherwise). Simulation results have proven the capability of the proposed method by illustrating the desired shaping of the AF based on the choice of the PDF of PCM. This provides for an additional degree of freedom in designing radar systems for target discrimination.

The invention claimed is:

1. A method for obtaining an adaptive angle-Doppler ambiguity function (AF) for a target scene using multiple-input-multiple-output (MIMO) radar, the MIMO radar including a transmit antenna array, the transmit antenna array being at least one-dimensional and having a plurality of antenna elements, the method comprising: generating transmit signals for transmission by the transmit antenna array, the transmit signals defining at least a first transmit trajectory of a phase center within the transmit antenna array; and transmitting the transmit signals using the transmit antenna array; receiving receive signals from the target, the receive signals resulting from the incidence of the transmit signals upon the target; and obtaining at least an angle-Doppler ambiguity function (AF) from the receive signals; wherein the first transmit trajectory is such that, in operation, the phase center undergoes random phase center motion (PCM), such that a phase center position within the transmit antenna array varies randomly with time.

2. The method according to claim 1, wherein the PCM includes correlated and uncorrelated transitions between positions within the transmit antenna array.

3. The method according to claim 1, wherein the first transmit trajectory corresponds to an amplitude modulation (AM) of the transmit signals so as to define a virtual array.

4. The method according to claim 3, wherein the phase center can assume any real position within the virtual array.

5. The method according to claim 1, wherein the PCM $\chi(i_c)$ is described by a corresponding probability density function PDF $\rho_{\chi(i_c)}$.

6. The method according to claim 5, wherein the transmit signals are such that a radiation characteristic $\Gamma(k'_{\phi_k}(q))$ for the time modulated transmit antenna, that is a function of the PCM $\chi(i_c)$ and of the PDF $\rho_{\chi(i_c)}$ is defined, such that $$\Gamma(k'_{\phi_k}(q)) = \int_{-\infty}^{\infty} \rho_\chi(i_{c1}) e^{-jk'_{\phi_k}(q)\chi(i_{c1})} d\chi(i_{c1})$$

where $\chi(i_c)$ denotes the phase center position at the transmit array and the switching across chirps is denoted by the chirp index $i_c$, j is the complex number.

7. The method according to claim 1, wherein the MIMO radar includes a receive antenna array, the receive antenna array being at least one-dimensional and having a plurality of antenna elements, wherein: receiving the receive signals from the object comprises receiving the receive signals using the receive antenna array; and the receive signals define at least a first receive trajectory of a phase center within the receive antenna array.

8. The method according to claim 7, wherein the first transmit trajectory and the first receive trajectory correspond or are identical.

9. The method according to claim 1, wherein obtaining at least an angle-Doppler ambiguity function (AF) from the receive signals comprises down-converting and digitizing the receive signals to obtain digitized receive signals written in matrix notation $Y \in \mathbb{C}^{I_c \times M}$ and given by $$[Y]_{i_c,m}(i_s) = \sum_{\kappa=1}^{K} c_\kappa e^{jk_\phi d_R m} e^{jk_\chi(i_c)} e^{j(\omega_{D_K}(i_c T_c + i_s T_s) + \omega_{B_K} i_s T_s)}$$

10. The method according to claim 9, wherein obtaining at least an angle-Doppler ambiguity function (AF) from the receive signals further comprises rearranging the digitized receive signals in a data-cube, where a first dimension contains the intra-chirp samples, a second dimension denotes the inter-chirp samples and a third dimension refers to the data from each receive antenna element.

11. The method according to any of the preceding claims, claim 1, wherein obtaining at least an angle-Doppler ambiguity function (AF) from the receive signals further comprises using a trajectory matched filter bank to extract Doppler and angular information from the receive signals.

12. The method according to claim 11, wherein a matched filter is applied to each dimension in order to compress the continuous wave such that the range, angle and Doppler information can be extracted.

13. The method according to claim 11, wherein obtaining at least an angle-Doppler ambiguity function (AF) from the receive signals further comprises squaring the output $[Y]_{i_c,m}(i_s)$ of the matched filter(s) to obtain a squared filter output $[\tilde{Y}]_{p,q}(l)$ for the p-th Doppler bin, q-th angular bin and l-th range bin, given by $$[\tilde{Y}]_{p,q}(l) = \left\| \sum_{\kappa=1}^{K} c_\kappa \sum_{m=1}^{M} e^{-j(q\Delta_\phi - k_\phi)dR^m} \times \sum_{i_s=1}^{I_s} e^{-j(l\Delta_r - (\omega_{D_\kappa} + \omega_{B_\kappa}))i_s T_s} \sum_{i_c=1}^{I_c} e^{-j(q\Delta_\phi - k_\phi)\chi(i_c)} e^{-j(p\Delta_D - \omega_{D_\kappa})i_c T_c} \right\|^2$$

where the intra-chirps sampling time is denoted $T_s$, $i_s$ describes the intra-chirp sample index, $T_c$ denotes the chirp duration and the switching across chirps is denoted by the chirp index $i_c$.

14. The method according to claim 13, further wherein obtaining at least an angle-Doppler ambiguity function (AF) from the receive signals further comprises averaging $[\tilde{Y}]_{p,q}(l)$ to obtain $$[\tilde{Y}]_{p,q}(l) = \sum_{\kappa=1}^{K} \sigma_\kappa^2 \|f_{r_\kappa}(l)\|^2 \|f_{\phi_\kappa}(q)\|^2 f_\chi(q, p)$$

where $$f_\chi(q, p) = I_c^2 \left( \left\| \frac{W(\omega'_{D_\kappa}(p))}{I_c} \right\|^2 \|\Gamma(k'_{\phi_\kappa}(q))\|^2 + \frac{1}{I_c}(1 - \|\Gamma(k'_{\phi_\kappa}(q))\|^2) \right)$$

and where the function W $$(\omega'_{D_\kappa}(p))$$

is the DTF of the rectangular time window and $W(0)=I_c$ denotes the signal energy.

15. A system for obtaining an angle-Doppler ambiguity function (AF) for a target using multiple-input-multiple-output (MIMO) radar, the system comprising:
a transmit antenna array, the transmit antenna array being at least one-dimensional and having a plurality of antenna elements; and processing circuitry, coupled to the transmit antenna array, the processing circuitry being configured to carry out the method of claim 1.

16. The system according to claim 15, further comprising a receive antenna array coupled to the processing circuitry, the receive antenna array being at least one-dimensional and having a plurality of antenna elements.

17. A non-transitory computer readable medium storing instructions which, when executed by processing circuitry, perform the method of claim 1.

18. The method according to claim 1, wherein the PCM is described by the second order PDF $\rho_{\chi(k),\chi(l)}$ where k, l are chirp or sample index, and/or the correlated PCM is described by its PDF and the auto-correlation function, $$r_\chi(k,l) = E\{e^{-j\omega(\chi(k) - \chi(l))}\}$$

for any ω and indices k, l and wherein $r_\chi(k, l)$ is a function of the difference in indices, i. e., $r_\chi(k, l) = r_\chi(k-l)$.

19. The method according to claim 13, further wherein obtaining at least an angle-Doppler ambiguity function (AF) from the receive signals further comprises averaging $[\tilde{Y}]_{p,q}(l)$ to obtain $$f_\chi(q, p) = \left| W(\omega'_{D_\kappa}(p)) \right|^2 * [F[r_\chi(i)]]_{\omega'_{D_\kappa}(q)}$$

where W ($\omega'_{D_\kappa}$(p)) denotes the convolution operation and $$[F[r_\chi(i)]]_{\omega'_{D_\kappa}(p)}$$

is the Fourier Transform of the correlation sequence evaluated at $\omega'_{D_\kappa}$(p).

20. A method according to claim 1, wherein the phase center motion (PCM) is designed based on the design of the autocorrelation function to impose nulls at specific Doppler locations, indexed by $\omega'_{D_\kappa}$(q).

* * * * *